G. W. RICE.
IRRIGATION CHECK.
APPLICATION FILED OCT. 17, 1916.
1,284,144.
Patented Nov. 5, 1918.
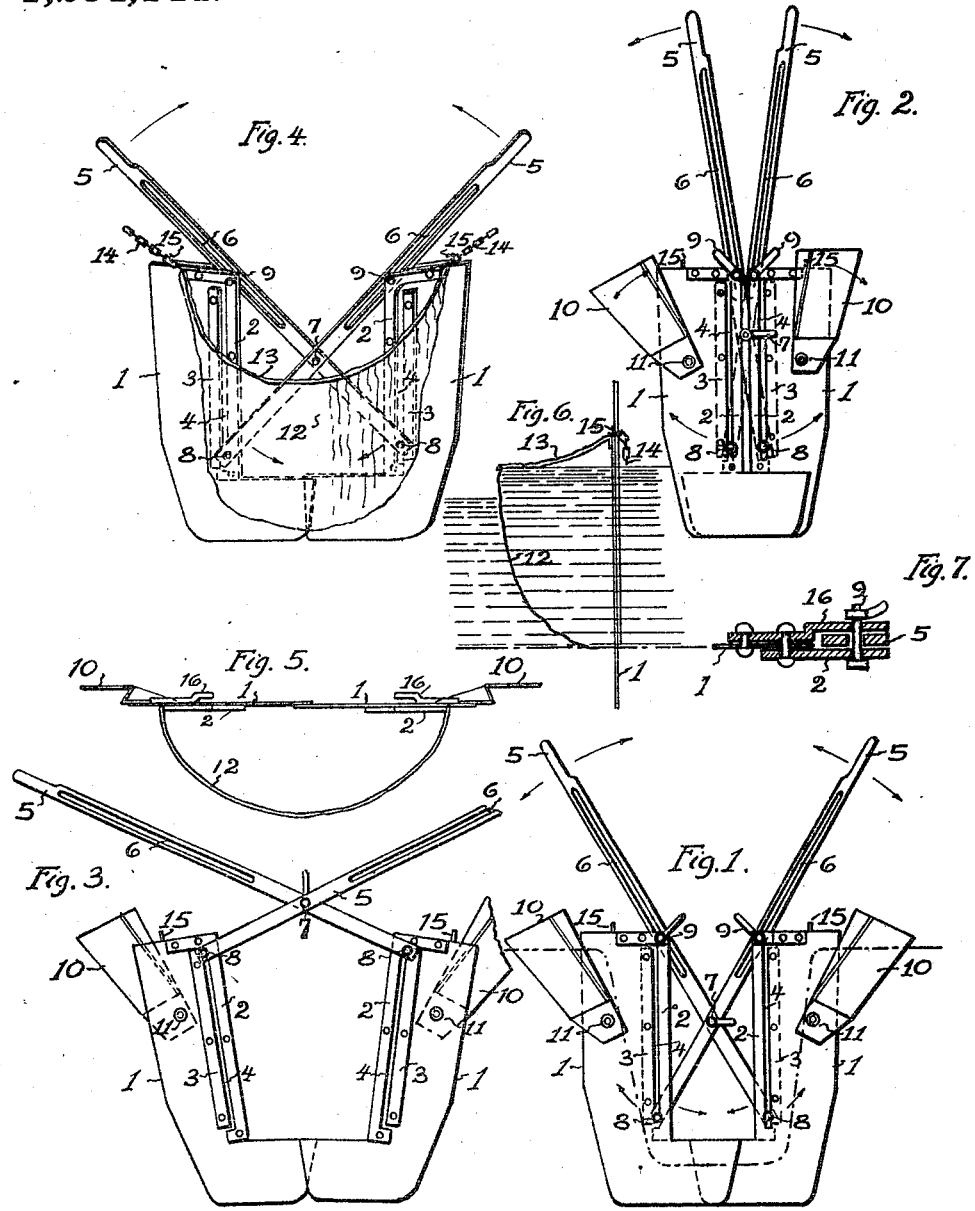

UNITED STATES PATENT OFFICE.

GEORGE W. RICE, OF TWIN FALLS, IDAHO.

IRRIGATION-CHECK.

1,284,144.  Specification of Letters Patent.  Patented Nov. 5, 1918.

Application filed October 17, 1916. Serial No. 126,220.

*To all whom it may concern:*

Be it known that I, GEORGE W. RICE, a citizen of the United States, residing at Twin Falls, and in the county of Twin Falls and in the State of Idaho, have invented a new and useful Irrigation-Check, of which the following is a specification.

My invention relates to improvements in an irrigation check, in which two vertically reciprocating wings operate in conjunction with two cross levers, and a canvas attached to each vertical wing with a chain through hem of canvas. My object is to provide a movable and adjustable irrigation check to fit any irrigation ditch, that will raise the water in the ditch as is necessary for taking it out of the ditch and on the land, and to let any surplus water pass over the check, and also provide a free passage over and through the check for weeds and other rubbish. I attain these objects by the mechanism illustrated in the accompanying drawings, in which—

Figure 1 shows a front view of check, and partly open.

Fig. 2 shows a front view of check closed.

Fig. 3 shows a rear view of the check with lower end of levers loosened and levers raised up to permit rubbish and surplus water to pass through and over the check.

Fig. 4 is an isometric view of check and canvas.

Fig. 5 is a top view of check and canvas with levers left off.

Fig. 6 is a longitudinal section of check and canvas.

Fig. 7 shows an enlarged section of upper hinge of levers.

1 represents two vertical mating wings each wing extending inward at the lower end and overlapping each other.

2 represents two iron lever guides that are bent inward or at a right angle at each end and fastened to the two mating wings 1.

3 represents two metallic strips fastened on the inside of vertical wings 1.

2 and 3 form an elongated slot 4, for bolt to run through and the same bolt to run through the lower end of lever.

The check has two cross levers 5 with elongated slot or hole 6. The levers cross each other and are connected by bolt and tail nut 7 at intersection of levers. Each lower end of each of the levers 5 is connected to the elongated slot or hole in wing 1 by bolt 8.

Each elongated slot 6 in each lever has a bolt and tail nut 9, which runs through the elongated slot 6, and then through top of guide iron 2 on each vertical wing 1 as shown in Figs. 1, 2 and 4.

10 represents two extra adjustable wings each being held in place by bolts 11 as shown in Figs. 1, 2 and 3, these extra wings being made so they may be moved outward and forced into the ditch bank for additional security of keeping water from washing around the check.

12 represents a canvas attached to the vertical wings 1 and upon the opposite side of check from levers, this canvas is fastened to vertical wings 1 by two metal strips 3 as shown in Figs. 1, 2, 3 and 4.

13 shows a hem in the top edge of canvas 12, through which chain 14 runs, this chain 14 can be raised or lowered on one or both sides and a link or links hooked on short lugs 15 to raise or lower the water as required or to let any surplus water or rubbish pass over the check.

Figs. 5 and 7 show iron straps with offsets 16 attached and fastened to wings 1 and lever guide 2.

The bolt and tail nut 9 in Fig. 7 holds levers 5 in position, and lets bolt 9 slide up or down in elongated slot in lever 5, and permits the check to spread.

Fig. 3 shows that by removing bolt 9 the levers are released at the top part of check, and by sliding the levers 5 upward, the bolts 8 sliding in elongated slots 4, and by fastening by bolt and tail nut 7 at the intersection of levers, the check is secured in the ditch and gives a free passage for any surplus water and rubbish to pass through and over the check.

By a stamping stroke the lower end of the check is sunk or stuck in the bottom of the ditch, and by pressing the levers apart the bolts 9 through elongated slots permit levers 5 to slide through and between guide irons and offset irons 16, thereby causing the check to spread and force the wings of check in the banks of the ditch, and to be secured either by bolts 9 or 7 as shown in Figs. 1 and 3.

Fig. 1 represents the ditch with check in place as ready for use.

The dash and dotted lines indicate ditch and banks of ditch.

I claim.

1. An adjustable and portable irrigation check comprising a pair of horizontally reciprocating wing members, a pair of levers crossing and pivotally connected intermediate their ends, each lever having a sliding connection with a wing at its lower end below the point of crossing, and a flexible trough attached to the inside edge of each vertical wing.

2. An adjustable and portable irrigation check comprising a pair of horizontally reciprocating main wings, a pair of crossed levers attached to each of said main wings, angularly bent supplemental wings pivotally secured adjacent their lower ends adjacent the outer edges of the main wings at their upper portions, and a flexible trough joining the inner edges of said main wings.

3. An adjustable and portable irrigation check comprising a pair of vertical plates having their lower inner edges projecting inwardly and overlapping, vertical guides adjacent the said inner edges, a pair of levers crossed and pivotally connected intermediate their ends, the lower ends of said levers pivotally and slidably mounted in said guides, and means for locking said levers into any degree of spread.

4. An adjustable and portable irrigation check comprising a pair of vertical plates, the lower inner edges of which project inwardly and overlap, vertical guides adjacent the inner edges thereof, a pair of levers crossed and pivotally connected intermediate their ends, the lower ends of said levers pivotally and slidably mounted in said guides, each of said levers being provided with elongated guide means above their point of crossing, said guide means having pivotal and slidable engagement with the upper ends of said plates, and a flexible trough joining the said inner edges of the plates.

GEORGE W. RICE.

Copies of this patent may be obtained for five cents each, by addressing the "Commissioner of Patents, Washington, D. C."